April 19, 1932. W. H. RENN 1,854,862
AUTOMATIC PRESSURE RETAINING VALVE
Filed April 23, 1930 3 Sheets-Sheet 1
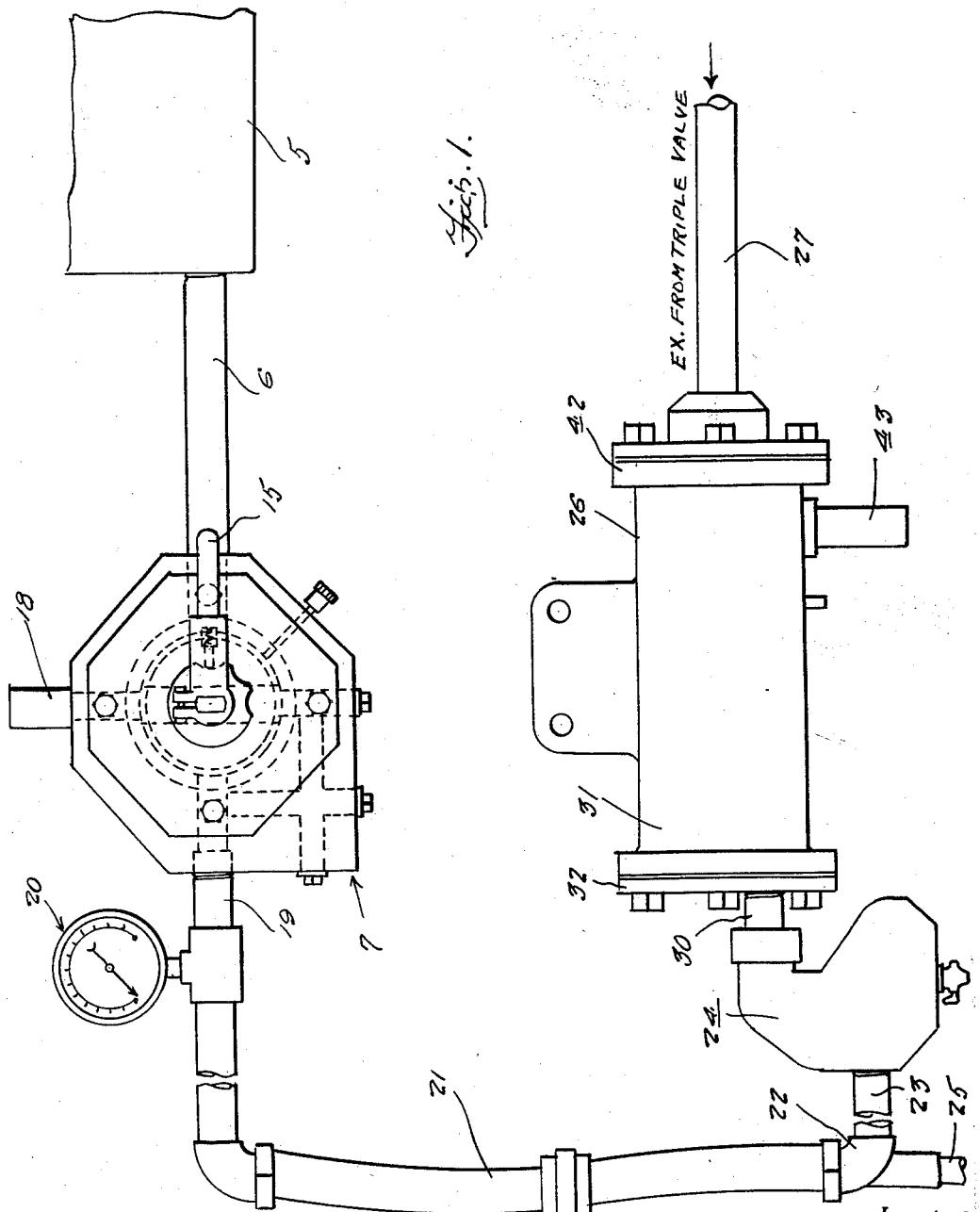
Inventor
W. H. Renn
By Clarence A. O'Brien
Attorney

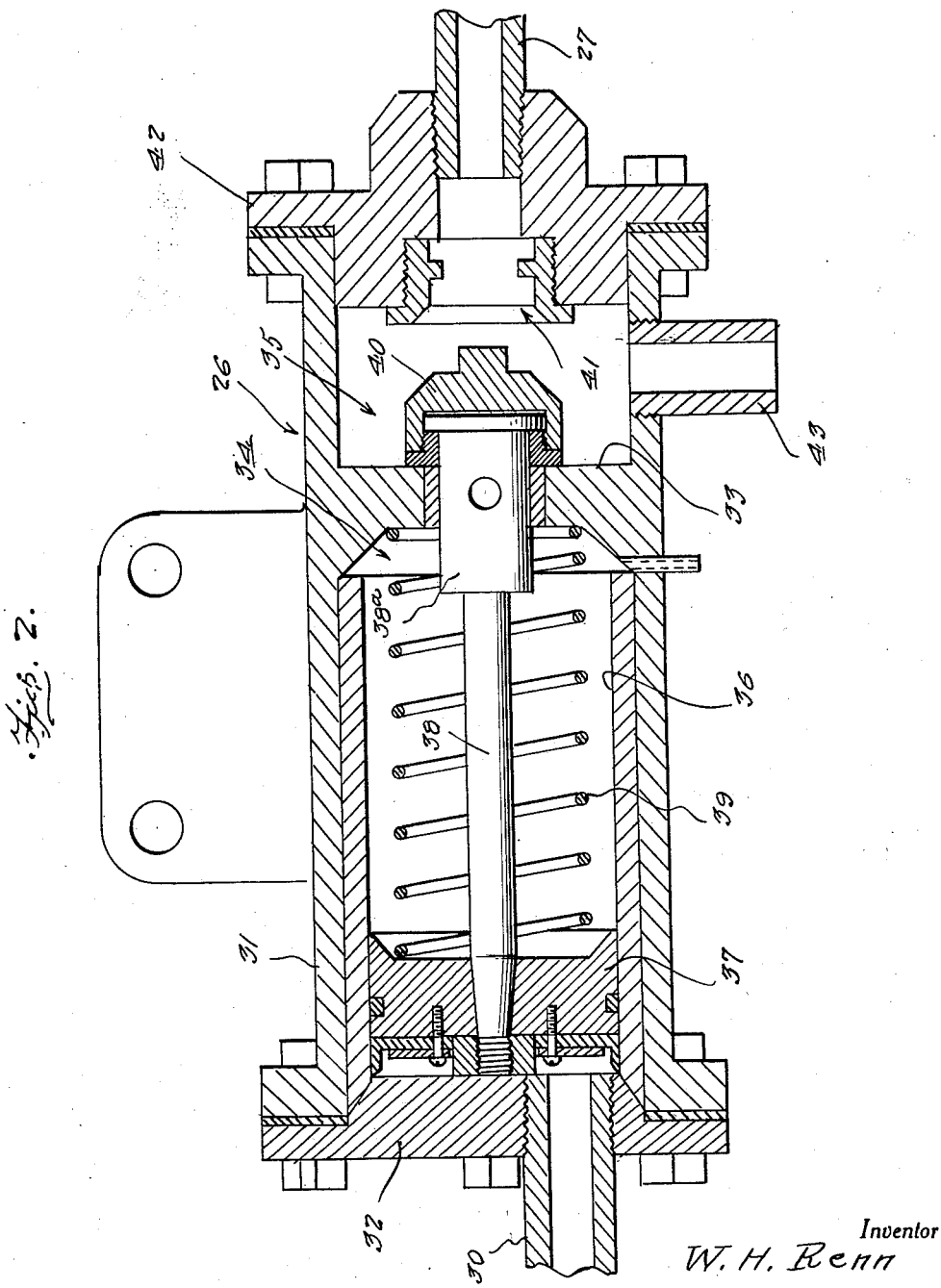

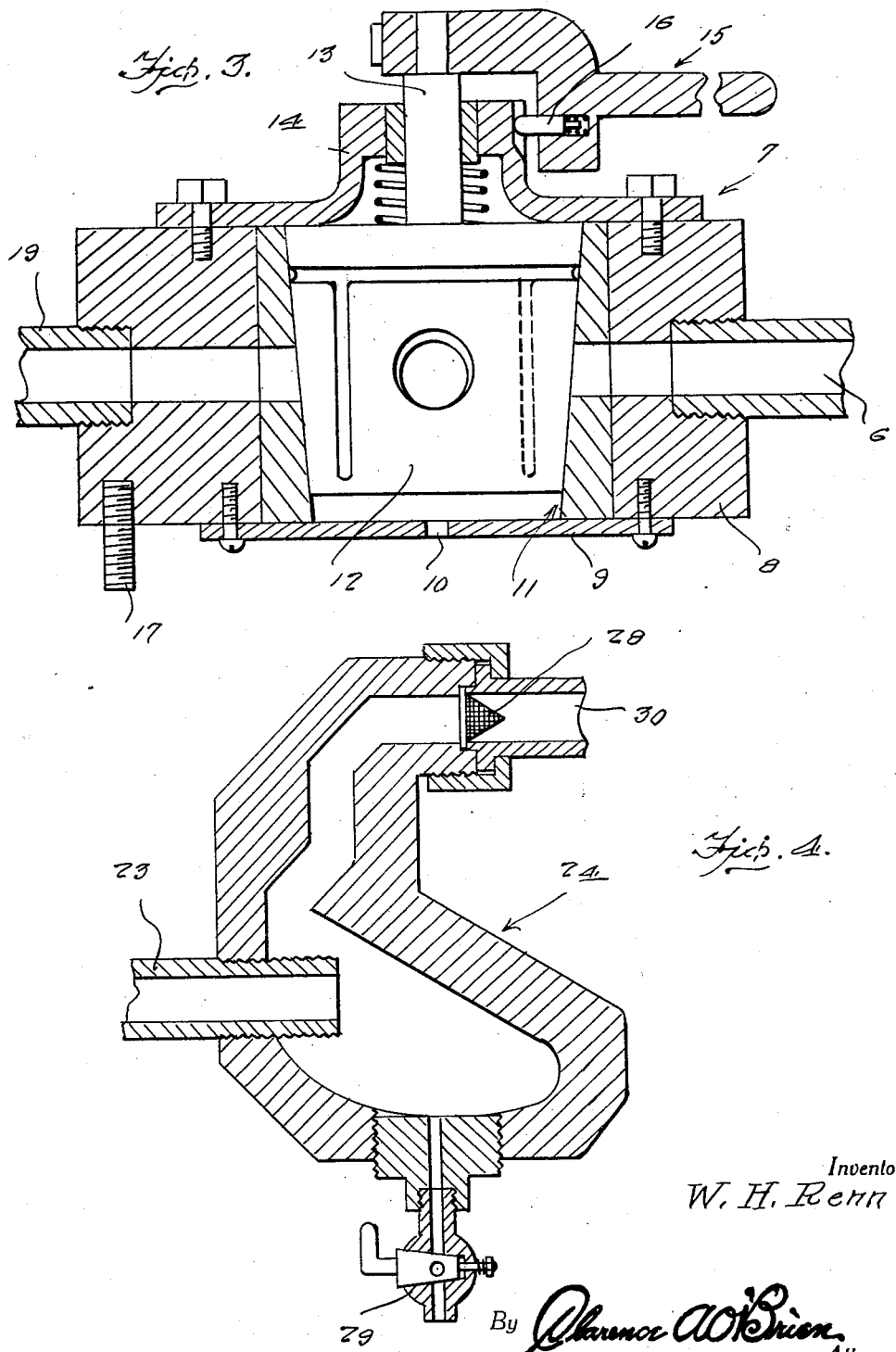

Patented Apr. 19, 1932

1,854,862

UNITED STATES PATENT OFFICE

WILLIAM H. RENN, OF DURHAM, NORTH CAROLINA, ASSIGNOR OF ONE-SIXTH TO RUDOLPH E. RENN AND ONE-SIXTH TO EUTICUS T. RENN, BOTH OF DURHAM, NORTH CAROLINA, AND ONE-THIRD TO CLYDE A. DOUGLASS, OF RALEIGH, NORTH CAROLINA

AUTOMATIC PRESSURE RETAINING VALVE

Application filed April 23, 1930. Serial No. 446,614.

This invention relates to an automatic pressure retaining valve adapted to be embodied in an air brake system of the type used upon trains and the like.

In carrying the inventive conception into practice and in involving and producing the structure for accomplishing the desired results, I have developed a simple and economical arrangement susceptible of being incorporated in present-day air-brake structures which is capable of fulfilling the requirements of a device of this kind in a practical and satisfactory manner.

In order to understand the fundamental advantages and features of the invention, I call attention at this time to the following enumerations:

First: The air brake automatic pressure retaining valve will enable the engineer to keep brakes on the entire train after brakes are applied and restore the pressure in auxiliary reservoirs and train lines all three at the same time. The air brake automatic pressure retaining valve will also enable the engineer to keep the requisite or any pressure below maximum Federal pressure at all times.

Second: The air brake automatic pressure retaining valve will enable the engineer to release any amount of pressure from the brake cylinder by working the air brakes automatic pressure retaining valves' controlling valve. The engineer will be able to maintain this pressure in brake cylinders until the descension is completed without other applications of air to brakes. (He will not have to keep applying and releasing the brakes to keep train under control.)

Other features and advantages will become more apparent from the following description and drawings.

In the drawings:

Figure 1 is a diagrammatic view showing one of the automatic pressure retaining valves embodied in the air brake system.

Figure 2 is an enlarged sectional view through the retaining valve itself.

Figure 3 is a sectional view of the engineer's control valve for the pressure retaining valve.

Figure 4 is a refuse trap and strainer.

Attention is first invited to Figure 1, wherein it will be observed that the numeral 5 designates the reservoir connected through the medium of the pipe 6 with the control valve 7. This valve 7 is of appropriate construction and located in the engineer's cab to permit it to be conveniently manipulated. Referring to Figure 3, it will be seen that it comprises a suitably shaped chassis or body 8 having a bottom plate 9 formed with a drain port 10.

The numeral 11 designates a suitable supported bushing for accommodating the tapered plug rotary valve element 12. This includes an operating stem or shaft 13 co-operable with the cover 14 and having an operating handle or lever 15 connected thereto. The handle is constructed to accommodate a spring pressed retaining latch 16. This latch is co-operable with the notches represented in Figure 1 as the "full release" "block position" and "full on position". The numeral 17 designates an attaching stud for mounting purposes.

This control valve may be of appropriate construction and at 18 it is formed with an exhaust outlet leading into the atmosphere. Then too, there is a pipe connection at 19 through which the main reservoir pressure is conducted, and associated with this is a pressure gauge 20. The gauge has piped connection with a suitable conduit 21 leading to and indirectly connected with a T-shaped coupling 22. The branch 23 is connected with a dirt trap 24 and a pipe 25 is connected with the remaining branch and leads to other cars (not shown).

The trap 24 is connected with the pressure retaining valve 26, and the pressure retaining valve in turn connects with the exhaust from the triple valve whose pipe is here designated by the numeral 27.

The trap 24 is of suitable design and includes a strainer 28 and a collection receptacle having a valved drain cock 29 located therewith. This trap has a pipe connection at 30 which leads to and is connected with a pressure retaining valve as shown in Figure 2.

Referring now to Figure 2, the construction of the pressure retaining valve may be observed. The pressure retaining valve comprises an open-ended cylinder 31 having a suitably packed closure head 32 attached to one end and having a partition 33 formed intermediate the ends. This partition defines distinguishable compartments or chambers 34 and 35 respectively.

A cylindrical bushing or sleeve 36 is arranged in the chamber 34, and this serves to accommodate the head 37 of the piston. The piston includes a stem 38 and an expansion coiled spring 39.

An enlarged portion 38a of the piston extends through the central lined aperture in the partition 33 where it is provided with a swivelled cut-off valve element 40. This valve is located in the chamber 35 and cooperates with the valve seat 41 carried by the opposite end closing head 42. The triple valve exhaust pipe 27 is connected with this head 42.

Leading from one side of the chamber 35 is an exhaust or outlet 43 for the triple valve exhaust pressure.

In operation, it is evident that when the train is descending a long or steep grade, the engineer will apply the brakes to the train and then resort to the control of the automatic pressure valve 26. This is done by placing the lever 15 (see Figure 1) in "full on" position. This will cause air in the main reservoir 5 to flow through the pipe 6 and through the control valve 7 into the pipe connection 19. Here it will flow through the passage or pipe 21 through the coupling 22, through the trap 24, and into the automatic valve 26 through the medium of the pipe connection 30.

Introducing this pressure into the automatic valve will act on the head of the piston to force it in a direction from left to right in Figure 2, against the tension of the spring 39. This will seat the valve head 40 against the seat 41 thus closing the triple valve exhaust connection. The engineer will then put the brake valve handle (not shown) in release position, and then in running position.

The air pressure thus put in the brake cylinder will not leak out because the valve 40 is seated against the seat 41. Next the engineer should move the lever 15 to "block" position, thus holding the air pressure in the automatic pressure retaining valve 26. In this way the brakes will remain on, though the brake valve handle has been placed in release position so that the brakes will stay on to keep the train from gaining too much speed, while at the same time air pressure is being built up in the system.

When the descension of the grade has been completed, the engineer will put the handle or lever 15 in full release position, thus causing the air to escape back through the trap and conduit 21 and then through the control valve and to discharge into the atmosphere through the outlet 18.

The coiled spring 39 will react when the pressure is relieved from the valve 26 to open the valve element 40, in this way releasing the air from the brake cylinder (not shown).

It is thought that persons skilled in the art to which the invention relates will be able to obtain a clear understanding of the invention after considering the description in connection with the drawings. Therefore a more lengthy description is regarded as unnecessary.

Minor changes in shape, size, and rearrangement of details coming within the field of invention claimed may be resorted to in actual practice if desired.

I claim:

In a fluid pressure brake system, a brake retainer of the type described adapted to be incorporated between a valved connection with the main reservoir of the system and the triple valve thereof, comprising a uniform tubular body having flanged ends and an interior partition intermediate the ends, a sleeve inserted in one end of the body, a head closing the said one end and retaining said sleeve, another head closing the other end of the body and provided with an inwardly facing valve seat, said valved connection having communication with the interior of the tubular body through said head, and said triple valve having communication with the interior of the tubular body and the said valve seat through said other head, an exhaust through the tubular body positioned between said partition and the said other head; and a piston reciprocable in the body between the partition and the head, a piston rod on the piston having an enlarged bearing portion reciprocable in a bearing in said partition, an enlarged valve on the end of the piston rod between the partition and the said other head for engagement with the valve seat upon valving fluid pressure from the said main reservoir through said valve connection and the said head, and a spring circumposed on the piston rod between the piston and the partition for normally retracting said valve out of engagement with the valve seat.

In testimony whereof I affix my signature.

WILLIAM H. RENN.